US011137776B2

(12) United States Patent
Zhou et al.

(10) Patent No.: US 11,137,776 B2
(45) Date of Patent: Oct. 5, 2021

(54) SYSTEMS AND METHODS FOR COORDINATING DEVICE ACTIONS

(71) Applicant: SZ DJI TECHNOLOGY CO., LTD., Shenzhen (CN)

(72) Inventors: You Zhou, Shenzhen (CN); Xuyang Feng, Shenzhen (CN); Cong Zhao, Shenzhen (CN); Jiaqi Yan, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 305 days.

(21) Appl. No.: 16/301,356

(22) PCT Filed: May 16, 2016

(86) PCT No.: PCT/CN2016/082188
§ 371 (c)(1),
(2) Date: Nov. 13, 2018

(87) PCT Pub. No.: WO2017/197556
PCT Pub. Date: Nov. 23, 2017

(65) Prior Publication Data
US 2019/0196513 A1   Jun. 27, 2019

(51) Int. Cl.
*G05D 1/10* (2006.01)
*B64C 39/02* (2006.01)
*G05D 1/00* (2006.01)

(52) U.S. Cl.
CPC .......... *G05D 1/104* (2013.01); *B64C 39/024* (2013.01); *G05D 1/0094* (2013.01);
(Continued)

(58) Field of Classification Search
CPC .... G05D 1/104; G05D 1/0094; B64C 39/024; B64C 2201/127; B64C 2201/123; B64C 2201/143
See application file for complete search history.

(56) References Cited

U.S. PATENT DOCUMENTS

| 10,852,723 | B2 * | 12/2020 | Moeller | G03B 37/04 |
| 2009/0021423 | A1 * | 1/2009 | Cheng | G01S 7/003 342/25 A |

(Continued)

FOREIGN PATENT DOCUMENTS

| CN | 103197684 A | 7/2013 |
| CN | 105116908 A | 12/2015 |

(Continued)

OTHER PUBLICATIONS

International Search Report from the Chinese Patent Office for International Application No. PCT/CN2016/082188, dated Feb. 22, 2017.

(Continued)

*Primary Examiner* — Frederick M Brushaber
(74) *Attorney, Agent, or Firm* — Finnegan, Henderson, Farabow, Garrett & Dunner, LLP

(57) ABSTRACT

The present disclosure relates to systems, methods, and computer-readable storage devices for the coordination of actions between movable objects. For example, a method may coordinate actions between at least a first and a second movable object. The method may detect, by the first movable object, the position of a target. The method may control the position of a first movable object based on the position of the target. A command may be received for the first movable object to perform an action in coordination with the second movable object. In some embodiments, the command may be to take images of the target to create a bullet time effect.

23 Claims, 12 Drawing Sheets

(52) U.S. Cl.
CPC .. *B64C 2201/123* (2013.01); *B64C 2201/127* (2013.01); *B64C 2201/143* (2013.01)

(56) References Cited

U.S. PATENT DOCUMENTS

| | | | |
|---|---|---|---|
| 2014/0119716 A1* | 5/2014 | Ohtomo | G05D 1/0094 396/8 |
| 2017/0161561 A1* | 6/2017 | Marty | H04N 5/23238 |
| 2017/0313416 A1* | 11/2017 | Mishra | B64D 47/02 |
| 2019/0196513 A1* | 6/2019 | Zhou | B64C 39/024 |

FOREIGN PATENT DOCUMENTS

| | | | | |
|---|---|---|---|---|
| CN | 105389988 A | | 3/2016 | |
| CN | 105554480 A | | 5/2016 | |
| EP | 2728308 A2 | | 5/2014 | |
| EP | 2866090 A2 | | 4/2015 | |
| JP | 2000147085 A | | 5/2000 | |
| KR | 20160024562 A | * | 8/2014 | ........... H04N 13/156 |
| KR | 2016/0024562 A | | 3/2016 | |
| WO | WO 2016041110 A1 | | 3/2016 | |
| WO | WO 2016/069497 A1 | | 5/2016 | |
| WO | WO 2017/197556 A1 | | 11/2017 | |

OTHER PUBLICATIONS

Extended European Search Report in counterpart European Patent Application No. 16901942, mailed by the European Patent Office dated Mar. 14, 2019 (8 pages).

English-Language Machine Translation of KR 2016/0024562 A to Yonsei University IACF (20 pages).

\* cited by examiner

[Fig. 1]
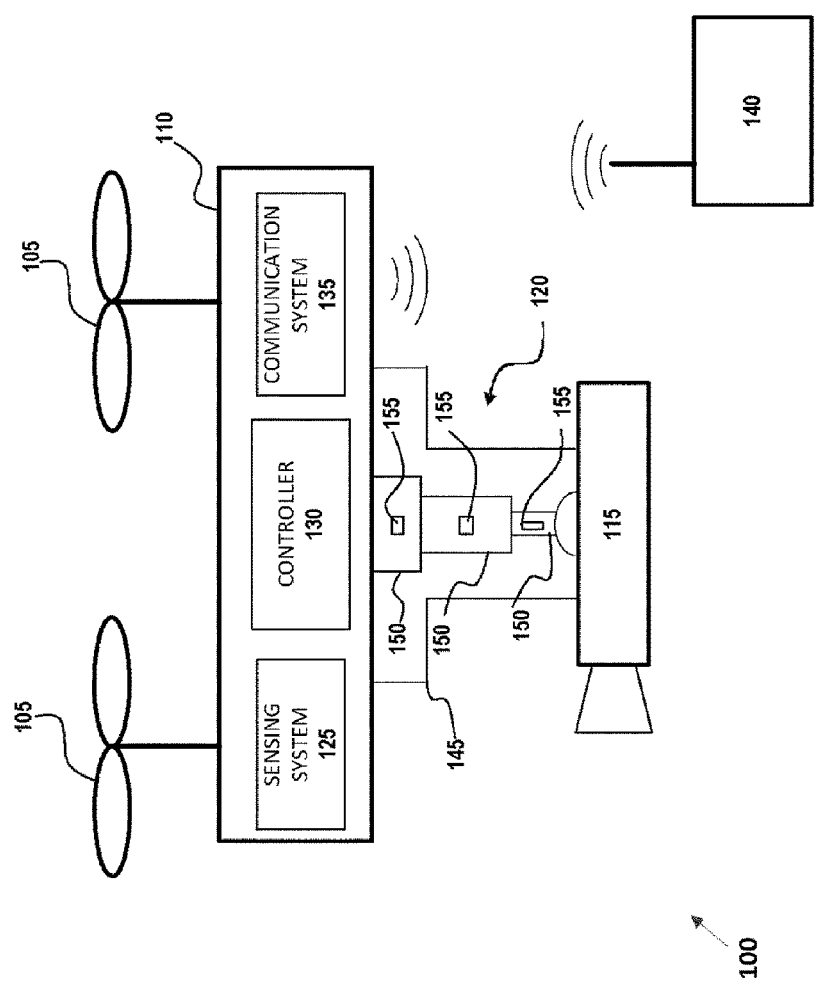

[Fig. 2]
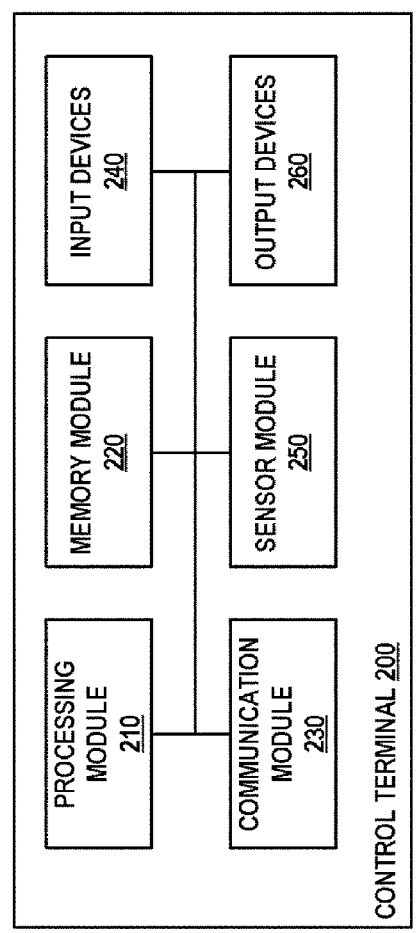

[Fig. 3]
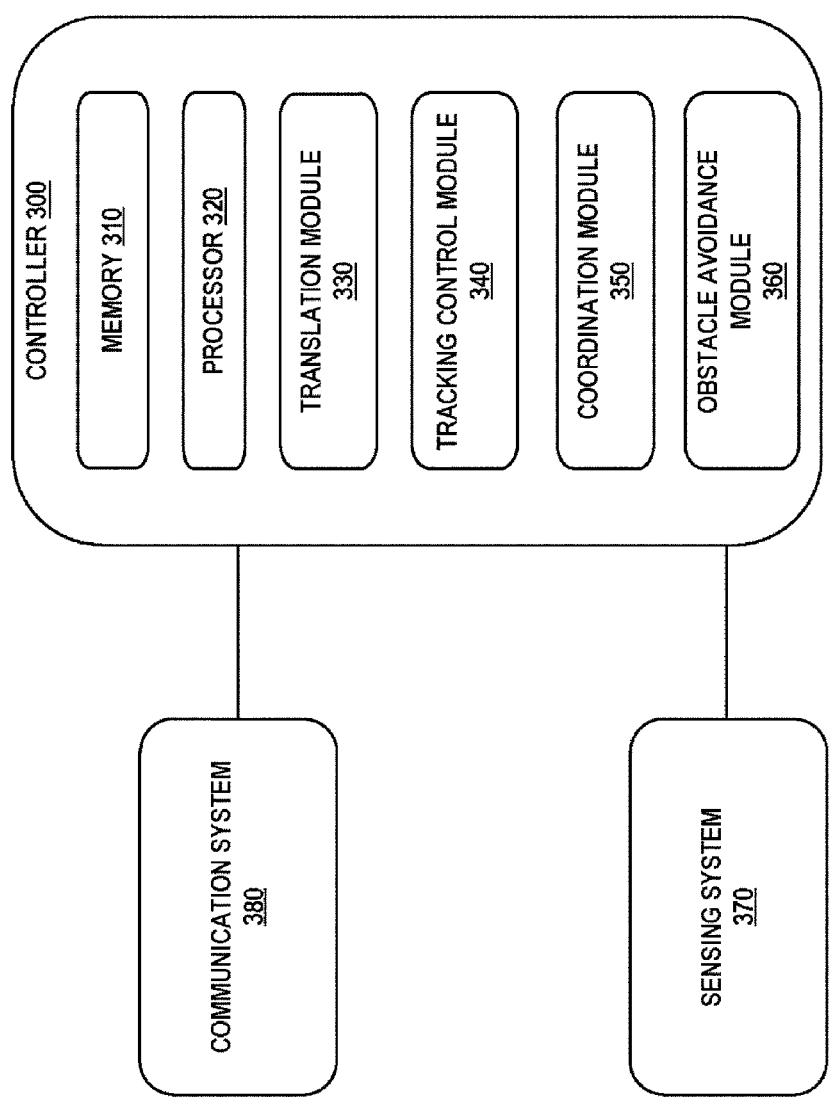

[Fig. 4]
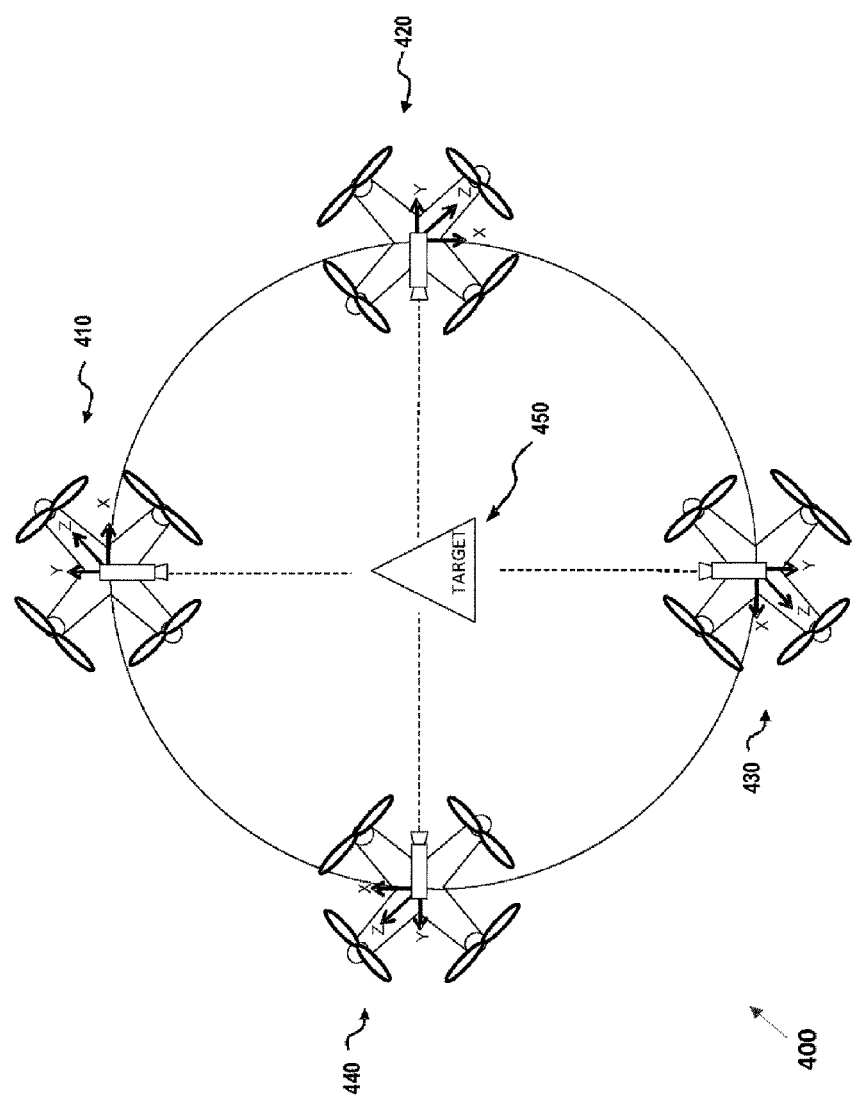

[Fig. 5]
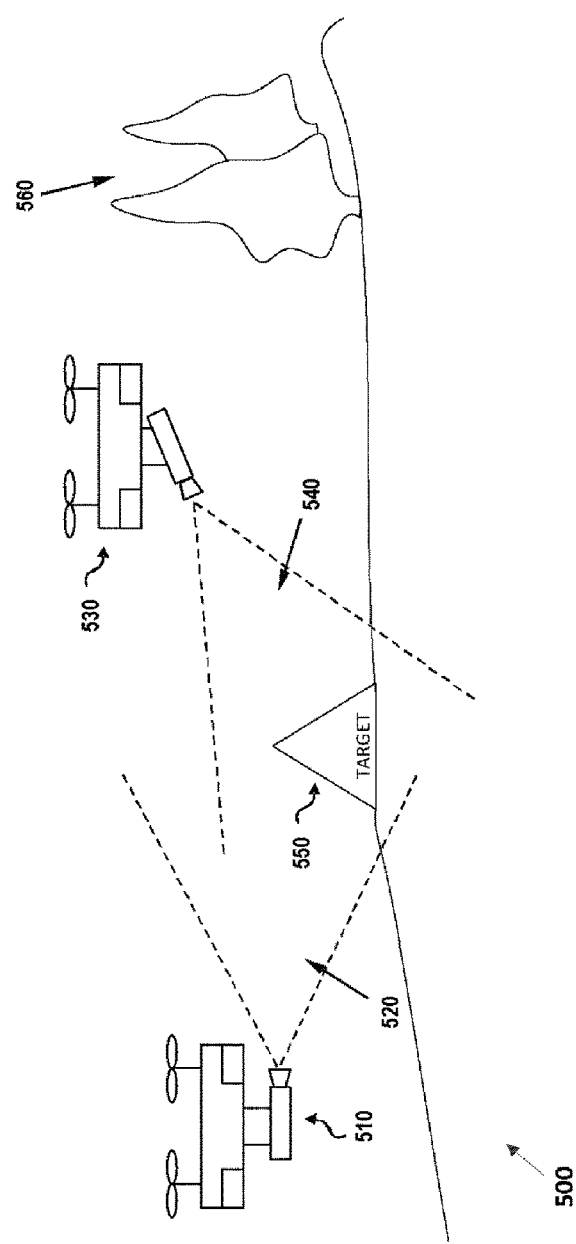

[Fig. 6]
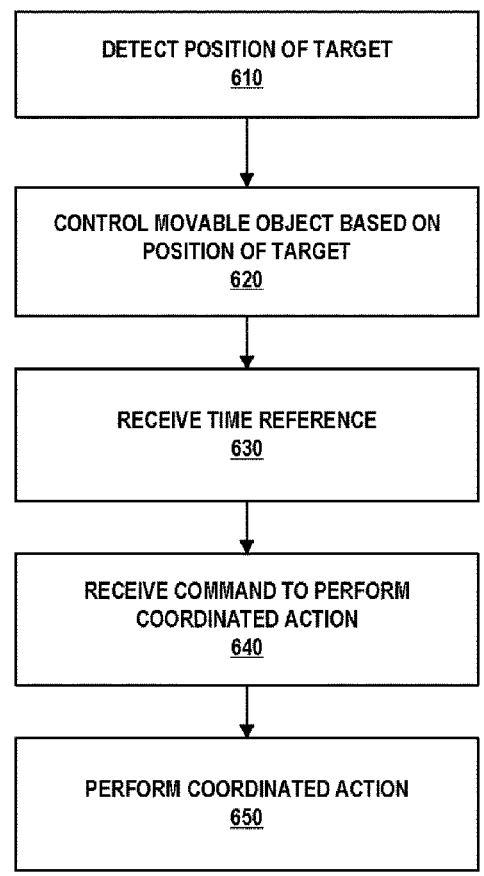

[Fig. 7]
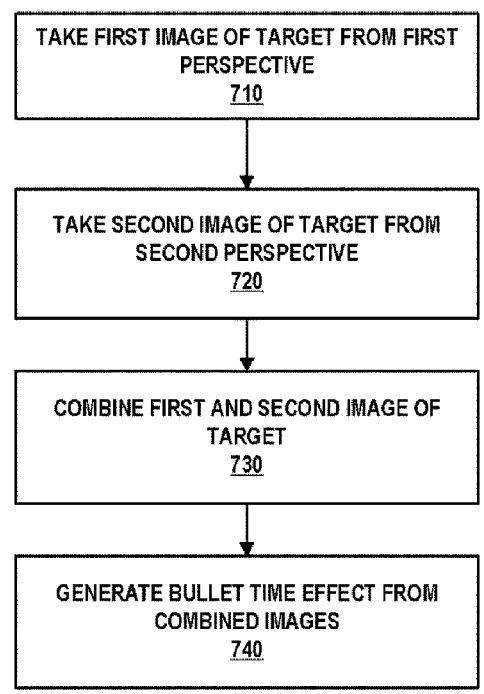

[Fig. 8]
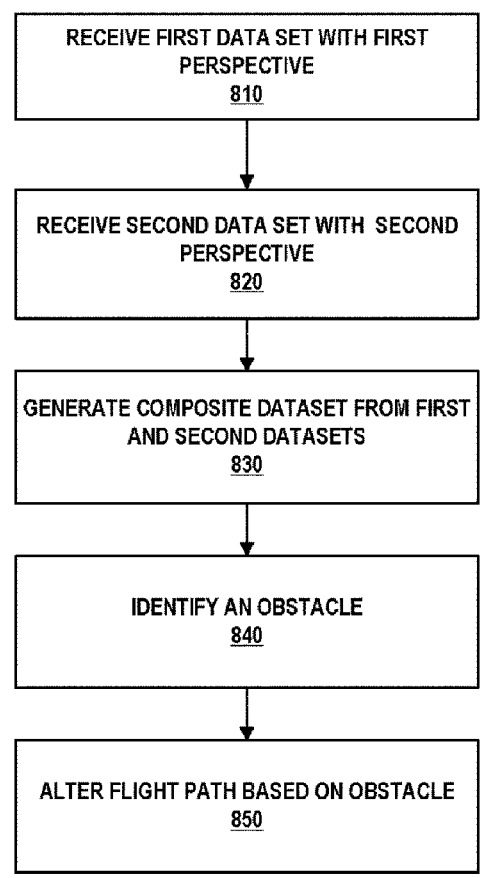

[Fig. 9]
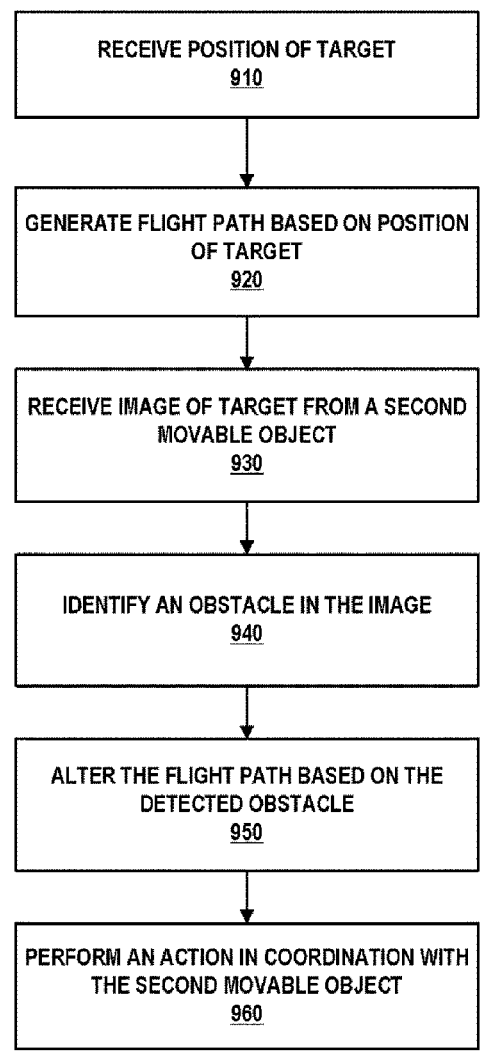

[Fig. 10]
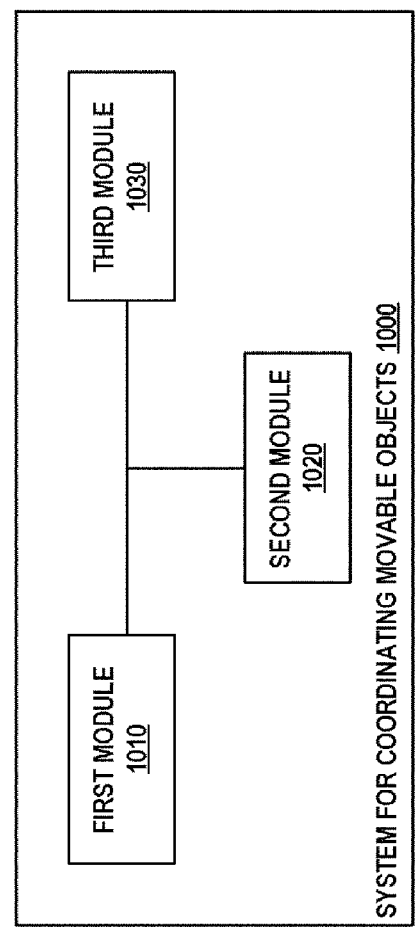

[Fig. 11]
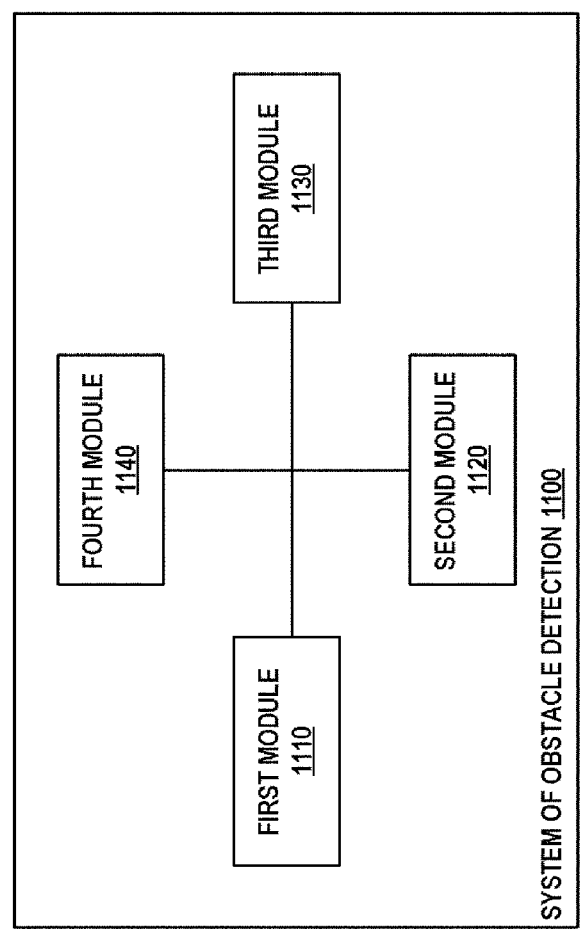

[Fig. 12]
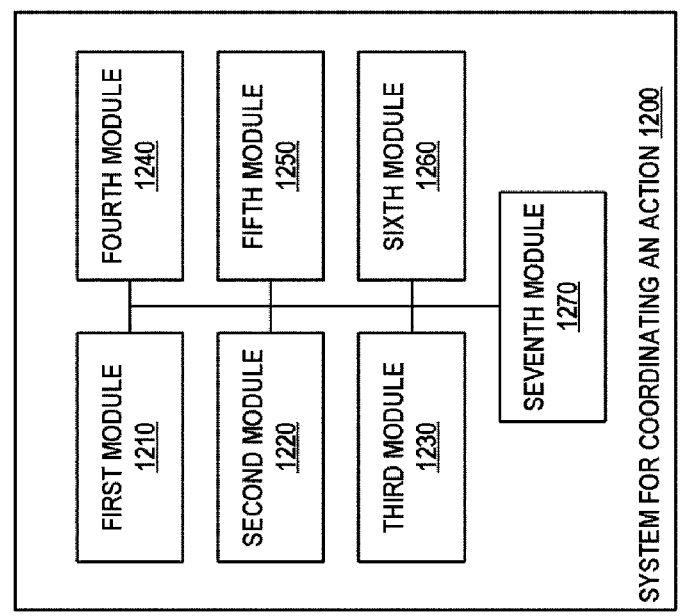

SYSTEMS AND METHODS FOR COORDINATING DEVICE ACTIONS

CROSS-REFERENCE TO RELATED PATENT APPLICATIONS

This application is a U.S. national stage entry under 35 U.S.C. § 371 of International Application No. PCT/CN2016/082188, filed May 16, 2016, which is hereby incorporated by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This disclosure relates generally to device coordination and control. More specifically, this disclosure relates to systems and methods for coordinating actions between movable objects.

BACKGROUND

Unmanned aerial vehicles ("UAV"), sometimes referred to as "drones," include pilotless aircraft of various sizes and configurations that can be remotely operated by a user and/or programmed for automated flight. UAVs can be used for many purposes and are often used in a wide variety of personal, commercial, and tactical applications. In many applications, UAVs can also be equipped with secondary devices to perform various tasks. For instance, UAVs equipped with imaging equipment, such as cameras, video cameras, etc., can capture images or video footage that is difficult, impractical, or simply impossible to capture otherwise. UAVs equipped with imaging devices find particular use in the surveillance, national defense, and professional videography industries, among others, and are also popular with hobbyists and for recreational purposes.

It can be difficult to coordinate the movement of multiple UAVs, which requires controlling the relative positions of the UAVs from each other, particularly with the multi-axis spatial orientation of the UAVs.

SUMMARY

Certain embodiments of the present disclosure relate to a method for coordinating movable objects. A position of a first movable object may be controlled based on a position of a target and a second movable object may be keeping track of the target. A command causes the first movable object to perform an action in coordination with the second movable object.

Certain embodiments of the present disclosure relate to a method for obstacle detection. A computing device may receive a first dataset indicating a first surrounding with a first perspective and a second dataset indicating a second surrounding with a second perspective. The computing device may generate a composite dataset from the first and second datasets and identify an obstacle within the composite dataset.

Certain embodiments of the present disclosure relate to a system for coordinating movable objects. The system may comprise a sensor for detecting a location of a target, a first movable object, a second movable object, and a device configured to issue a command for the first and second movable objects to take a coordinated action. The first and second movable objects may both receive the location of the target and track the target.

Certain embodiments of the present disclosure relate to a method for coordinating an action of a first unmanned aerial vehicle (UAV) with a second UAV. The first UAV may receive a position of a target and generate a moving path based on the position of the target to maintain the first UAV at a position relative to the target. The first UAV may receive an image from a second UAV and identify an obstacle in the image. The first UAV may alter the moving path based on the identification of the obstacle. The first UAV may receive a command to perform an action, and may perform the action in coordination with the second UAV.

Certain embodiments of the present disclosure relate to a system for avoiding obstacles. The system may comprise a first movable object and a second movable object, which both may be configured to track a target. The first and second movable objects may be arranged around the target such that the second movable object is in the field of view of the first movable object.

Certain embodiments of the present disclosure relate to a non-transitory computer-readable medium storing instructions that, when executed, cause a movable object to perform a method for coordinating movable objects. A position of a first movable object may be controlled based on a position of a target and a second movable object may be keeping track of the target. A command may cause the first movable object to perform an action in coordination with the second movable object.

Certain embodiments of the present disclosure relate to a non-transitory computer-readable medium storing instructions that, when executed, cause a computing device to perform a method of obstacle detection. The computing device may receive a first dataset indicating a first surrounding with a first perspective and a second dataset indicating a second surrounding with a second perspective. The computing device may generate a composite dataset from the first and second datasets and identify an obstacle within the composite dataset.

Certain embodiments of the present disclosure relate to a non-transitory computer-readable medium storing instructions that, when executed, cause a first unmanned aerial vehicle (UAV) to perform a method for coordinating actions. The first UAV may receive a position of a target and generate a moving path based on the position of the target to maintain the first UAV at a position relative to the target. The first UAV may receive an image from a second UAV and identify an obstacle in the image. The first UAV may alter the moving path based on the identification of the obstacle. The first UAV may receive a command to perform an action, and may perform the action in coordination with the second UAV.

Certain embodiments of the present disclosure relate to a system for coordinating movable objects. The system may comprise one or more microprocessors and a controller. The controller may run on the one or more microprocessors and be configured to control a position or motion of a first movable object based on a position of a target. The controller may be further configured to receive a command to perform an action in coordination with at least a second movable object, the second movable object keeping track of the target. The controller may be further configured to perform the action in coordination with the second movable object.

Certain embodiments of the present disclosure relate to a system for coordinating movable objects. The system may comprise one or more microprocessors and a detector. The detector may run on the one or more microprocessors and be configured to receive a first dataset indicating a first surrounding with a first perspective. The detector may be further configured to receive a second dataset indicating a second surrounding with a second perspective. The detector may be further configured to generate a composite dataset from the first and the second datasets. The detector may also be configured to identify an obstacle within the composite dataset.

Certain embodiments of the present disclosure relate to a system for coordinating movable objects. The system may comprise one or more microprocessors and a controller. The controller may run on the one or more microprocessors and be configured to receive a position of a target and generate a moving path based on the position of the target to maintain a first unmanned aerial vehicle (UAV) at a position relative to the target. The controller may be further configured to receive an image from a second UAV, identify an obstacle in the image from the second UAV, and alter the moving path based on the identification of the obstacle. The controller may also be configured to receive a command to perform an action and perform the action in coordination with the second UAV.

Additional objects and advantages of the present disclosure will be set forth in part in the following detailed description, and in part will be obvious from the description, or may be learned by practice of the present disclosure. The objects and advantages of the present disclosure will be realized and attained by means of the elements and combinations particularly pointed out in the appended claims.

It is to be understood that the foregoing general description and the following detailed description are exemplary and explanatory only, and are not restrictive of the disclosed embodiments.

BRIEF DESCRIPTION OF THE DRAWINGS

The accompanying drawings, which comprise a part of this specification, illustrate several embodiments and, together with the description, serve to explain the disclosed principles. In the drawings:

FIG. 1 illustrates an exemplary movable object with a carrier and a payload and a control terminal, consistent with the present disclosure.

FIG. 2 illustrates an example control terminal that may be used with embodiments consistent with the present disclosure.

FIG. 3 illustrates a controller that may be used with embodiments of the present disclosure.

FIG. 4 illustrates a system for the coordination of movable objects, consistent with the present disclosure.

FIG. 5 illustrates a system for obstacle avoidance by movable objects, consistent with the present disclosure.

FIG. 6 is a flowchart illustrating an exemplary method of coordinating actions between movable objects, consistent with the disclosed embodiments.

FIG. 7 is a flowchart illustrating an exemplary method of creating a bullet time effect, consistent with the disclosed embodiments.

FIG. 8 is a flowchart illustrating an exemplary method of avoiding an obstacle by a movable object, consistent with the disclosed embodiments.

FIG. 9 is a flowchart illustrating an exemplary method of avoiding an obstacle while coordinating actions between movable objects, consistent with the disclosed embodiments.

FIG. 10 illustrates an exemplary system for coordinating movable objects, consistent with the disclosed embodiments.

FIG. 11 illustrates an exemplary system of obstacle detection by a computing device, consistent with the disclosed embodiments.

FIG. 12 illustrates an exemplary system for coordinating an action, consistent with the disclosed embodiments.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be interpreted as open ended, in that, an item or items following any one of these words is not meant to be an exhaustive listing of such item or items, or meant to be limited to only the listed item or items.

As used in this application and in the claims, the singular forms "a," "an," and "the" include the plural forms unless the context clearly dictates otherwise. Additionally, the term "includes" means "comprises." Further, the term "coupled" does not exclude the presence of intermediate elements between the coupled items.

As used in this application and in the claims, moving parameters may include moving path parameters, in that it describes the parameters used to alter a trajectory and movement of a movable object. Moving path may include flight path, in that it describes a trajectory and movement of a movable object.

The systems and methods described herein should not be construed as limiting in any way. Instead, the present disclosure is directed toward all novel and non-obvious features and aspects of the various disclosed embodiments, alone and in various combinations and sub-combinations with one another. The disclosed systems and methods are not limited to any specific aspect or feature or combinations thereof, nor do the disclosed systems and methods require that any one or more specific advantages be present or problems be solved. Any theories of operation are to facilitate explanation, but the disclosed systems, methods, and apparatus are not limited to such theories of operation.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus. Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by one of ordinary skill in the art.

Systems and methods consistent with the present disclosure are directed to coordinating actions between a plurality of movable objects. In some embodiments the movable objects may be unmanned aerial vehicles. In other embodiments, the movable objects may be automobiles, boats, radio controlled vehicles, robots, etc. The movable objects may track a target or targets and be positioned at points in space relative to the target (e.g., at predetermined distances and angles). The movable objects may receive the position of the target using a sensor. In some embodiments, the position of the target may be received from a communication device included in the target. The movable objects may receive a time reference that is common to the movable objects and/or the target in order to coordinate (e.g., synchronize) actions by the movable objects. The time reference may be received from a time service, a terminal controlling operations of at least one of the movable objects, or from one of the movable objects. In some embodiments, the movable objects may take images of the target at specified times (e.g., timed at specific intervals, or simultaneous). The images may be transferred between the movable objects or transmitted to a computing system remote from the movable objects (e.g., controller, server, cloud computing devices, etc.). In some embodiments, the images may be combined to form a composite image containing spatial and temporal information from the input images. In some examples, the composite image can be used to create a bullet time effect. In some embodiments, one or more of the movable objects may combine the images. In other embodiments, a remote computing device may process received images from the movable objects. The remote computing device may be a terminal, another movable object, or a server. In some embodiments, a movable object may receive a position of a second movable object and generate a moving path to maintain the position of the first movable object relative to the position of the target and/or the position of the second movable object. In some embodiments, a movable object may include a camera that is pointed at the target as the movable object changes position. In some embodiments, the movable objects may perform obstacle avoidance as described below.

Systems and methods consistent with the present disclosure are further directed to obstacle avoidance by one or more movable objects. In some embodiments, the movable objects may be unmanned aerial vehicles. In other embodiments, the movable objects may be automobiles, boats, radio controlled vehicles, robots, etc. In some embodiments, the movable objects may include an imaging device (e.g., camera, video equipment, FLIR imager, etc.) attached to the movable object. The imaging device may be used to track a target and/or take pictures in different directions. In some embodiments, a movable object may receive an image including a perspective of the surroundings of the movable object not available to the movable object. The image may be received from another movable object or some other system used for taking images. In some embodiments, images are combined to form a composite image. The composite image may contain three-dimensional information indicating the size and location of at least one object. The movable object may analyze the received image and determine if any obstacles are present in its path. Determining obstacles may include determining a location of an object in the composite image relative to a moving path of a movable object and classifying the object as an obstacle if the moving path of the movable object intersects the location of the object. If an obstacle is present, the movable object may alter its path, thus avoiding the obstacle. In some embodiments, the movable objects may coordinate actions with other movable objects, as described above.

Systems and methods consistent with the present disclosure are still further directed to obstacle avoidance by movable objects while the movable objects are performing coordinated actions. In some embodiments, movable objects may be positioned at different points relative to a target. Each movable object may be tracking the target and be positioned at predetermined points in space relative to the target. In some examples, the movable objects may include imaging devices, where the imaging devices are pointed at the target. In some embodiments, images taken from each movable object include surroundings that are not visible to the imaging device from the other movable object. For example, the movable objects may be on opposite sides of the target, thus surroundings behind one movable object would be visible from the other movable object. In some embodiments, the movable objects may exchange images and use the exchanged images to avoid obstacles. The movable objects may also perform coordinated actions with each other (e.g., take pictures of the target at specified times).

FIG. 1 illustrates an exemplary movable object 100 that may be configured to move or travel within an environment (e.g., surroundings). Movable object 100 may be any suitable object, device, mechanism, system, or machine configured to travel on or within a suitable medium (e.g., a surface, air, water, rails, space, underground, etc.). For example, movable object 100 may be an unmanned aerial vehicle (UAV). Although movable object 100 is shown and described herein as a UAV for exemplary purposes of this description, it is understood that other types of movable object (e.g., wheeled objects, nautical objects, locomotive objects, other aerial objects, etc.) may also or alternatively be used in embodiments consistent with this disclosure. As used herein, the term UAV may refer to an aerial device configured to be operated and/or controlled automatically (e.g., via an electronic control system) and/or manually by off-board personnel.

As shown in FIG. 1, movable object 100 may include one or more propulsion devices 105 connected to main body 110 and may be configured to carry a payload 115. In some embodiments, as shown in FIG. 1, payload 115 may be connected or attached to movable object 10 by a carrier 120, which may allow for one or more degrees of relative movement between payload 115 and main body 110. In other embodiments, payload 115 may be mounted directly to main body 110 without carrier 120. Movable object 100 may also include a sensing system 125, a controller 130 in communication with the other components, and a communication system 135.

Movable object 100 may include one or more (e.g., 1, 2, 3, 3, 4, 5, 10, 15, 20, etc.) propulsion devices 105 positioned at various locations (e.g., top, sides, front, rear, and/or bottom of main body 110) for propelling and steering movable object 100. Propulsion devices 105 may be devices or systems operable to generate forces for sustaining controlled flight. Propulsion devices 105 may share or may each separately include or be operatively connected to a power source (not shown), such as a motor (e.g., an electric motor, hydraulic motor, pneumatic motor, etc.), an engine (e.g., an internal combustion engine, a turbine engine, etc.), a battery bank, etc., or combinations thereof. In some examples, propulsion devices 105 may also include one or more rotary components (e.g., include rotors, propellers, blades, nozzles, etc.) drivably connected to the power source and configured to participate in the generation of forces for sustaining controlled flight. Rotary components may be driven on or by a shaft, axle, wheel, hydraulic system, pneumatic system, or other component or system configured to transfer power from the power source. Propulsion devices 105 and/or rotary components may be adjustable (e.g., tiltable) with respect to each other and/or with respect to main body 110. Alternatively, propulsion devices 105 and the rotary components may have a fixed orientation with respect to each other and/or main body 110. In some embodiments, each propulsion device 1105 may be of the same type. In other embodiments, propulsion devices 105 may be of different types. In some embodiments, all propulsion devices 105 may be controlled in concert (e.g., all at the same speed and/or angle). In other embodiments, one or more propulsion devices may be independently controlled with respect to, e.g., speed and/or angle.

Propulsion devices 105 may be configured to propel movable object 100 in one or more vertical and horizontal directions and to allow movable object 100 to rotate about one or more axes. That is, propulsion devices 105 may be configured to provide lift and/or thrust for creating and maintaining translational and rotational movements of movable object 100. For instance, propulsion devices 105 may be configured to enable movable object 100 to achieve and maintain desired altitudes, provide thrust for movement in all directions, and provide for steering of movable object 100. In some embodiments, propulsion devices 105 may enable movable object 100 to perform vertical takeoffs and landings (i.e., takeoff and landing without horizontal thrust). In other embodiments, movable object 100 may require constant minimum horizontal thrust to achieve and sustain flight. Propulsion devices 105 may be configured to enable movement of movable object 100 along and/or about multiple axes, as described below.

Payload 115 may include one or more sensory devices, which may include devices for collecting or generating data or information, such as surveying, tracking, and capturing images or video of targets (e.g., objects, landscapes, subjects of photo or video shoots, etc.). Payload 115 may include imaging devices configured to generate images. For example, imaging devices may include photographic cameras, video cameras, infrared imaging devices, ultraviolet imaging devices, x-ray devices, ultrasonic imaging devices, radar devices, etc. Payload 115 may also, or alternatively, include devices or capturing audio data, such as microphones or ultrasound detectors. Payload 115 may also or alternatively include other suitable sensors for capturing visual, audio, and/or electromagnetic signals.

Carrier 120 may include one or more devices configured to hold the payload 115 and/or allow the payload 115 to be adjusted (e.g., rotated) with respect to main body 110. For example, carrier 120 may be a gimbal. Carrier 120 may be configured to allow payload 115 to be rotated about one or more axes, as described below. In some embodiments, carrier 120 may be configured to allow 360° of rotation about each axis to allow for greater control of the perspective of the payload 14. In other embodiments, carrier 16 may limit the range of rotation of payload 14 to less than 360° (e.g., ≤270°, ≤210°, ≤180°, ≤120°, ≤90°, ≤45°, ≤30°, ≤15°, etc.), about one or more of its axes.

Carrier 120 may include a frame assembly 145, one or more actuator members 150, and one or more carrier sensors 155. Frame assembly 145 may be configured to couple the payload 115 to the main body 110 and, in some embodiments, allow payload 115 to move with respect to main body 110. In some embodiments, frame assembly 145 may include one or more sub-frames or components movable with respect to each other. Actuator members 150 may be configured to drive components of frame assembly relative to each other to provide translational and/or rotational motion of payload 115 with respect to main body 110. In other embodiments, actuator members 150 may be configured to directly act on payload 115 to cause motion of payload 115 with respect to frame assembly 145 and main body 110. Actuator members 150 may include electric motors configured to provide linear or rotational motion to components of frame assembly 145 and/or payload 115 in conjunction with axles, shafts, rails, belts, chains, gears, and/or other components.

Carrier sensors 155 may include devices configured to measure, sense, detect, or determine state information of carrier 120 and/or payload 115. State information may include positional information (e.g., relative location, orientation, attitude, linear displacement, angular displacement, etc.), velocity information (e.g., linear velocity, angular velocity, etc.), acceleration information (e.g., linear acceleration, angular acceleration, etc.), and or other information relating to movement control of carrier 120 or payload 115 with respect to main body 110. Carrier sensors 155 may include one or more types of suitable sensors, such as potentiometers, optical sensors, visions sensors, magnetic sensors, motion or rotation sensors (e.g., gyroscopes, accelerometers, inertial sensors, etc.). Carrier sensors 155 may be associated with or attached to various components of carrier 120, such as components of frame assembly 145, actuator members 150, or main body 110. Carrier sensors 155 may be configured to communicate data to and/or receive data from controller 130 via a wired or wireless connection (e.g., RFID, Bluetooth, Wi-Fi, radio, cellular, etc.). Data generated by carrier sensors 155 and communicated to controller 130 may be further processed by controller 130. For example, controller 130 may determine state information of movable object 100 and/or targets.

Carrier 120 may be coupled to main body 110 via one or more damping elements configured to reduce or eliminate undesired shock or other force transmissions to payload 115 from main body 110. Damping elements may be active, passive, or hybrid (i.e., having active and passive characteristics). Damping elements may be formed of any suitable material or combinations of materials, including solids, liquids, and gases. Compressible or deformable materials, such as rubber, springs, gels, foams, and/or other materials may be used as damping elements. The damping elements may function to isolate and/or dissipate force propagations from main body 110 to payload 115. Damping elements may also include mechanisms or devices configured to provide damping effects, such as pistons, springs, hydraulics, pneumatics, dashpots, shock absorbers, and/or other devices or combinations thereof.

Sensing system 125 may include one or more sensors associated with one or more components or other systems of movable device 100. For instance, sensing system may include sensors for determining positional information, velocity information, and acceleration information relating to movable object 10 and/or targets. In some embodiments, sensing system may also include carrier sensors 155. Components of sensing system 125 may be configured to generate data that may be used (e.g., processed by controller 130 or another device) to determine additional information about movable object 100, its components, or its targets. Sensing system 125 may include one or more sensors for sensing one or more aspects of movement of movable object 100. For example, sensing system 125 may include sensory devices associated with payload 115 as discussed above and/or additional sensory devices, such as a receiver for a positioning system (e.g., GPS, GLONASS, Galileo, Beidou, GAGAN, etc.), motion sensors, inertial sensors (e.g., IMU sensors), proximity sensors, image sensors, etc. Sensing system 125 may also include sensors or be configured to provide data or information relating to the surrounding environment, such as weather information (e.g., temperature, pressure, humidity, etc.), lighting conditions, air constituents, or nearby obstacles (e.g., objects, structures, people, other vehicles, etc.).

Controller 130 may be configured to receive inputs (e.g., from sensing system 125 and/or communication system 135) and produce outputs (e.g., to control propulsion devices 105, payload 115, etc., or to provide data to sensing system 125, communication system 135, etc. Controller 130 may include a computing device, such as a processor, and memory. The memory may store instructions to configure modules to be executed by the processor. Controller 130 may also comprise hardware, such as application specific integrated circuits, etc., to perform process inputs and generate outputs. Controller 130 is described in more detail with reference to FIG. 3, below.

Communication system 135 may be configured to enable communications of data, information, commands, and/or other types of signals between controller 130 and off-board entities. Communication system 135 may also be configured to receive timing information, such as from a global timing system (e.g., GPS, atomic clock, terminal 140, etc.). Communication system 135 may include one or more components configured to send and/or receive signals, such as receivers, transmitter, or transceivers that are configured to carry out one- or two-way communication. Components of communication system 135 may be configured to communicate with off-board entities via one or more communication networks, such as radio, cellular, Bluetooth, Wi-Fi, RFID, etc. For example, communication system 135 may be configured to enable communications between devices for providing input for controlling movable object 100 during flight, such as a control terminal ("terminal") 140.

Terminal 140 may be configured to receive input, such as input from a user (i.e., user input), and communicate signals indicative of the input to controller 130. Terminal 140 may be configured to receive input and generate corresponding signals indicative of one or more types of information, such as control data (e.g., signals) for moving or manipulating movable device 100 (e.g., via propulsion devices 105), payload 115, and/or carrier 120. Terminal 140 may also be configured to receive data from movable object 100, such as operational data relating to positional data, velocity data, acceleration data, sensory data, and/or other data relating to components and/or the surrounding environment. In some embodiments, terminal 140 may be a remote control with physical sticks configured to control moving parameters, or a touch screen device, such as a smartphone or a tablet, with virtual controls for the same purposes, or an application on a smartphone or a table, or a combination thereof. In other embodiments, terminal 140 may be a device configured to transmit information about its position or movement. For example, terminal 140 may include a receiver for a positioning system and sensors to detect movement or angular acceleration, such as accelerometers or gyros. Terminal 140 may be affixed to a target and transmit data to controller 130 regarding the position of the target, the target's orientation, and the targets trajectory. Terminal 140 may communicate data to a user or other remote system, and receive data from a user or other remote system.

FIG. 2 illustrates an exemplary control terminal ("terminal") (e.g., remote computing device) 200 that may be used with embodiments consistent with the present disclosure. Terminal 200 may be an electronic device, such as a cellular phone, a tablet, a personal digital assistant, a laptop computer, or other device; or a control station installed inside a control tower or building. As shown in FIG. 2, terminal 200 may include processing module 210, memory module 220, communication module 230, input devices 240, and output devices 250.

Processing module 210 may execute computer-executable instructions stored in software and may be a real or a virtual processor device. In a multi-processing system, multiple processing units execute computer-executable instructions to increase processing power.

Memory module 220 may be volatile memory (e.g., registers, cache, RAM), non-volatile memory (e.g., ROM, EEPROM, flash memory, etc.), or some combination of the two. The memory may store software implementing computer applications (e.g., apps) for terminal 200. For example, the memory may store an operating system, software implementing transmission of positional data from the terminal 200 to a remote device, such as movable object 100. Typically, operating system software provides an operating environment for other software executing in the computing environment, and coordinates activities of the components of the computing environment.

Communication module 230 may facilitate communication of information between terminal 200 and other entities, such as movable object 100. Communication module 230 may include antennae or other devices configured to send or receive signals. Terminal 200 may also include one or more input devices 240 configured to receive input (e.g., from a user and/or sensors module 250 included or connected to terminal 200) for communication to movable object 100. It is understood, however, that other possible embodiments or layouts of terminal may be possible and are within the scope of this disclosure.

In some embodiments, terminal 200 has a plurality of input devices 240 configured to receive user inputs indicative of desired movements of movable object 100 or its components. In some examples, terminal 200 may include input devices 240, such as input levers, buttons, triggers, etc. Input devices 240 may be configured to generate a signal to communicate to movable object 100 using communication module 230. In addition to movement control inputs, input devices 240 may be used to receive other information, such as manual control settings, automated control settings, control assistance settings.

In some embodiments, terminal 200 may also include output devices 260 configured to display and/or receive information to and/or from a user. For example, terminal 200 may be configured to receive signals from a remove device, which signals may be indicative of data relating to movements of the device and/or data (e.g., imaging data) acquired by the device. In some embodiments, output devices 260 may be a multifunctional display device configured to display information on a multifunctional screen as well as receive user input via the multifunctional screen (e.g., touch input). In another embodiment, a multifunctional screen may constitute a sole input device for receiving user input.

In some embodiments, terminal 200 may be or include an interactive graphical interface for receiving one or more user inputs. Graphical versions of terminal 200 and/or input devices 240 may be displayable on output devices 260 and include graphical features (e.g., graphical buttons, text boxes, dropdown menus, interactive images, etc.). For example, in one embodiment, terminal 200 may include graphical representations of input levers, buttons, and triggers, which may be displayed on and configured to receive user input via a multifunctional screen. In some embodiments, terminal 200 may be configured to generate graphical versions of input devices 240 in conjunction with an app to provide an interactive interface on the display device or multifunctional screen of any suitable electronic device (e.g., a cellular phone, a tablet, etc.) for receiving user inputs.

In some embodiments, output devices 260 may be an integral component of terminal 200. In other embodiments, output devices 260 may be connectable to (and disconnectable from) terminal 200.

In some embodiments, terminal 200 may be attached or integrated into a target and be used to transmit positional data about the target. For example, terminal 200 may include sensors to determine the position and trajectory of terminal 200. In other embodiments, terminal 200 may receive information about its position and relay it to other devices, such as movable object 100. In this way, terminal 200 may be used to automatically provide a movable object (e.g., UAV, autonomous car, movable platform, etc.) with current positional data on a target.

FIG. 3 illustrates a controller 300 that may be used with embodiments of the present disclosure. Controller 300 may be included in movable object 100, as shown in FIG. 1. As shown in FIG. 3, controller 300 may include one or more components, for example, a memory 310, at least one processor 320, a translation module 330, a tracking control module 340, a coordination module 350, and obstacle avoidance module 360.

Memory 310 may be or include non-transitory computer-readable medium and can include one or more memory units of non-transitory computer-readable medium. Non-transitory computer-readable medium of memory 310 may be or include any type of disk including floppy disks, optical discs, DVD, CD-ROMs, microdrive, and magnetooptical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data. Memory units may include permanent and/or removable portions of non-transitory computer-readable medium (e.g., removable media or external storage, such as an SD card, RAM, etc.).

Memory 310 may store data acquired from sensing system 370. Memory 310 may also be configured to store logic, code and/or program instructions executable by processor 320 to perform any suitable embodiment of the methods described herein. For example, memory 310 may be configured to store computer-readable instructions that, when executed by processor 320, cause the processor to perform a method comprising one or more steps. The method performed by the processor based on the instructions stored in memory 310 may involve processing data (e.g., stored in memory 310, received from terminal 200, received from sensing system 370 (e.g., received directly from sensing system or retrieved from memory), and/or received via communication device 380. In some embodiments, sensing system 370 may be the same sensing system as described in FIG. 1. In some embodiments, communication device 380 may be the same communication system as described in FIG. 1. In some embodiments, memory 310 can be used to store the processing results produced by the processor 320.

Processor 320 may include one or more processor devices and may execute computer-executable instructions stored in software in memory 310. Processor 320 may be a real or a virtual processor device. In a multi-processing system, multiple processing units execute computer-executable instructions to increase processing power. Processor 320 may include or more processors and may embody a programmable processor (e.g., a central processing unit (CPU)). Processor 320 may be operatively coupled to memory 310 or another memory device.

In some embodiments, processor 320 may include and/or alternatively be operatively coupled to one or more control modules, such as a translation module 330, tracking control module 340, coordination module 350, and obstacle avoidance module 360.

Processor 320 can be operatively coupled to the communication device 380 and be configured to transmit and/or receive data from one or more external devices (e.g., terminal 200 or other remote controller). For example, communication device 380 can utilize one or more of local area networks (LAN), wide area networks (WAN), infrared, radio, Wi-Fi, point-to-point (P2P) networks, cellular networks, cloud communication, and the like. Optionally, relay stations, such as towers, satellites, or mobile stations, can be used. Wireless communications can be proximity dependent or proximity independent. In some embodiments, line-of-sight may or may not be required for communications.

The components of controller 300 can be arranged in any suitable configuration. For example, controller 300 may be distributed in different portions of movable object 100 (e.g., main body 110, carrier 120, payload 115, terminal 140, sensing system 125, or an additional external device in communication with one or more of the above). In some embodiments, one or more processors or memory devices can be in different portions of movable object 100.

Translation module 330 may be configured to translate information, such as inputs, command, and other signals, from one perspective (e.g., a perspective of the user, a perspective of a movable object, etc.) to another perspective (e.g., another of the perspective of the user, a movable object, or another perspective). Translation module 330 may perform the translation between two perspectives through matrix transformation, e.g., by constructing a matrix representation of the user input (i.e., in terms of the user coordinate system) and transforming the matrix into a command matrix representation of the user input (i.e., in terms of the local coordinate system) based on the offset between the user's perspective and the perspective of the movable object. Translation may be accomplished as described in PCT Application No. PCT/CN2016/074824, which is hereby incorporated by reference in its entirety.

Tracking control module 340 may be configured to control the propulsion devices of a movable object to adjust the spatial disposition, velocity, and/or acceleration of the movable object with respect to six degrees of freedom (e.g., yaw, roll, and pitch). In some embodiments, tracking control module 340 may be configured to identify a target and control the propulsion system to maintain the movable object in a fixed position relative to a target. Target identification may be accomplished as described in PCT Patent Application No. PCT/CN2016/075224, which is hereby incorporated by reference in its entirety.

In some embodiments, the movable object may include a camera or video equipment as a payload. Images acquired from the payload (e.g., through sensing system 370) may be transmitted using communication device 380 to a terminal where a user may select a target in the images (e.g., stationary objects such as parked cars, buildings, geographic features, or slow-moving objects such as a person on a hike, or a fast-moving object such as a moving vehicle). In some examples, the terminal may analyze the images to identify and extract the target based on pixel regions. Data defining the target may be received by communication device 380 and further processed by controller 300. In other embodiments, the controller 300 may receive the user selection from the terminal using communication device 380. Tracking control module 340 may use the user selection to process images (including video frames) captured from the payload to identify a user-selected target object in those images. Tracking control module 340 may use the identified target to further track the target. In further embodiments, controller 300 may be configured to utilize the input from sensing system 370 (e.g., images from a camera or other payload) to identify and/or track targets during flight.

Target tracking may be accomplished as described in PCT Patent Application No. PCT/CN2016/074824, which is hereby incorporated by reference in its entirety. Tracking a target during flight may include identifying the target and maintaining the target in a field of sight of the movable object even while the target and/or movable object is moving. Maintaining the target within the tracking view of the movable object may require the movable object to automatically adjust its moving parameters to keep sight of the target (i.e., in the perspective of movable object or payload) while reconciling these tracking movements with the desired movement of movable object commanded by the user (i.e., from the user's perspective or another reference perspective). Tracking control module 340 may automatically adjust moving parameters of a moving path to maintain the target in view. Moving parameters to achieve and maintain target tracking may include relative position (e.g., linear, angular, etc.), speed (e.g., linear, angular, etc.), and acceleration parameters (e.g., linear, angular, etc.) of the movable object with respect to the target. In some embodiments, the desired moving parameters may be user specified.

In some examples, tracking control module 340 may be configured to use feedback control of moving parameters to maintain a moving path with the current perception of the target from the perspective of movable object while providing for smoother movement and continued tracking during flight parameter adjustment. For example, controller 300 may receive image data from sensor system 370 and determine a current relative distance D1 between the movable object and the target. Tracking control module 340 may compare the current relative distance D1 to an initial relative distance D0, which may be a desired relative distance or a relative distance from a previous iteration. Tracking control module 340 may use feedback to determine whether there is a difference between the initial relative distance D0 and the current relative distance D1. When the two are the same, movable object is following at the correct distance and no change in moving parameters is necessary. When there is a difference, tracking control module 340 may be configured to determine a control speed for the movable object in the direction of the relative distance for adjusting the current relative distance to match the initial relative distance.

Tracking control module 340 may be configured to carry out feedback control using any suitable feedback process. For example, feedback controller may be configured to carry out proportional control (P), integral control (I), derivative control (D), proportional-integral control (PI), or proportional-integral-derivative control (PID). Tracking control module 340 may also or alternatively be configured to apply one or more mathematical filters to conduct or enhance feedback control processes. It is understood that other or additional feedback control and filtering processes may be used. It is also contemplated that tracking control module 340 also use feedback control to maintain desired angles, relative speed, etc., between the movable object and the target.

In some embodiments, controller 300 may continuously track a target. In this case, controller 300 may adjust the moving path of the movable object to maintain a position relative to the target and to keep the target in view.

Consistent with embodiments of the present disclosure, coordination module 350 may be configured to coordinate actions of a movable object with other movable objects. For example, coordination module 350 may be configured to control the movable object or payload to perform an operation in coordination with another movable object. In some embodiments, coordination module 350 may control a camera to take a picture at a certain time, in coordination with other movable objects, to generate images of a target from a specified orientation. The images from the various movable objects acting in coordination may be combined to form composite images with three-dimensional effects, such as bullet time.

Obstacle avoidance module 360 may be configured to control the propulsion devices of a movable object to adjust the movable object's moving path to avoid objects. Obstacle avoidance module 360 may interact with tracking control module 340 to ensure that the movable object tracks a target while avoiding obstacles in the movable object's path. In some embodiments, obstacle avoidance module 360 may analyze datasets stored in memory 310 that indicate structures surrounding the movable object. The datasets may be derived from images received by controller 300 from sensing system 370 and/or images received from an external source through communication device 380. Obstacle avoidance module 360 may identify structures in a dataset (e.g., image) and determine the relative location of the structure as compared to the movable object. Obstacle avoidance module 360 may utilize image recognition methods, machine vision, or the like, to analyze the datasets. Obstacle avoidance module 360 may compare the location of the structures to the current moving path of the movable object to determine if the structure is in the moving path. If the structure is in the current moving path, Obstacle avoidance module 360 may alter moving parameters to adjust the moving path to avoid the obstacle.

Translation module 330, tracking control model 340, coordination module 350, and obstacle avoidance module 360 may be implemented in software for execution on processor 320, or may be implemented in hardware or software components separate from processor 320.

FIG. 4 illustrates a system 400 with movable objects 410, 420, 430, 440 that coordinate actions therebetween, consistent with the present disclosure. Movable objects 410, 420, 430, and 440 are positioned around a target 450. Movable objects 410, 420, 430, and 440 may be tracking target 450 and maintaining predetermined positions around target 450.

In some embodiments, movable objects 410, 420, 430, and 440 may each include a payload, such as a camera or video equipment. The payload may point at target 450. Each movable object may be at the same elevation or at different elevations. It is noted that images taken by each movable object will have a different perspective associated with the corresponding movable object (as indicated by the x, y, z coordinate system shown in the FIG. 4).

In some embodiments, the movable objects may receive commands to track the target 450 at predetermined positions. For example, the movable objects may arrange themselves, or are sent command(s) to arrange themselves, in patterns around the target 450. In some examples, the movable objects may be arranged in a diamond shape, a pyramid shape (e.g., at least one movable object above the target 450 and other movable objects at a lower elevation), a spiral pattern, etc. As shown in FIG. 4, the movable objects are in a diamond pattern. In some examples, target 450 may transmit a position to the movable objects, thus the movable objects may not require image identification capabilities. In other embodiments, movable objects may identify target 450 and track it using image recognition, as described herein. In still other embodiments, the movable objects may be positioned to point their respective payloads at predetermined points in space and maintain their position. In this case, the movable objects may wait in position and target 450 may pass through the area in view of each movable object.

In some embodiments, common timing information may be provided to synchronize timing between the movable objects. In some examples, target 450 may also receive the timing information. The movable objects may also receive a command to perform a coordinated action based on the timing information. For example, movable object 410 may receive a command to take a picture of target 450 at time t1. Movable object 420 may receive a command to take a picture of target 450 at time t2. Movable object 430 may receive a command to take a picture of target 450 at time t3. Movable object 440 may receive a command to take a picture of target 450 at time t4. In some examples, t1, t2, t3, and t4 may be the same time. In other examples, they may be separated by a predetermined time (e.g., based on their relative distance from each other or the target 450), such as 1 ms to 10 seconds. Each movable object takes the action (e.g., take a picture) at the time (t1, t2, t3, t4) based on the common timing information so all movable objects take the action in a coordinated fashion.

Images taken from any movable objects may be transmitted to the other movable objects, or they may be transmitted to a terminal or other remote computing device (e.g., server, cloud computing devices, mobile phone, PDA, remote computing device, etc.). In some embodiments, the images are combined to form a combined image. The images may be combined in a movable object or a remote computing device. In some examples, the images are combined to form a three-dimensional image. The images may be combined using structure from motion (SfM), as described below with reference to FIG. 7, or other known techniques. In some embodiments, the images may be combined to form a series of three-dimensional images that incorporate the space-time attributes of the individual two-dimensional images. In other embodiments, single images from each movable object may be arranged and displayed consecutively to produce an orbiting viewpoint of an action frozen in time or as hyper-slow-motion. The images may, thus, be combined to for a visual impression of detaching the time and space of a camera from that of target 450 (e.g., bullet time). In this way, the movable objects can act as an array of cameras surrounding the target 450 to capture multiple images at predetermined times. This method is superior to standard bullet time arrangements, which require a set of still cameras surrounding the subject.

FIG. 5 illustrates an exemplary system 500 for obstacle avoidance by movable objects, consistent with the present disclosure. FIG. 5 shows a movable object 510 with an imaging device with a field of view 520, movable object 530 with an imaging device with a field of view 540, target 550, and obstacle 560. Movable objects 510 and 530 track target 550 using imaging devices with certain fields of view. In some embodiments, target 550 may be moving, for example, from left to right in FIG. 5.

Movable object 510 may be tracking target 550 with its imaging device pointing in its own direction of motion. Movable object 530 may be tracking target 550 with its imaging device pointing away from its own direction of motion. In some embodiments, the movable objects may arrange themselves, or are sent command(s) to arrange themselves, in patterns around the target 550. In some examples, the movable objects may be arranged in a diamond shape, a pyramid shape (e.g., at least one movable object above the target 550 and other movable objects at a lower elevation), a spiral pattern, etc.

In this example, movable object 530 may receive images from movable object 510, or vice versa. Alternatively, images from movable objects 510 and/or 530 may be transmitted to a remote computing device for further analysis. Images may be transmitted using a communications system/device as described above. The images may include surroundings that are not detectable by movable object 530 (e.g., not in its field of view). In some embodiments, movable object 530 may analyze the received images to determine if structures are in its fight path. In other embodiments, the images may be analyzed using a remote computing device, and results of the analysis may be transmitted back to one or both movable objects. Images may be analyzed using SfM, machine vision, or other suitable processing technique. If any structures are in movable object 530's moving path, the structures may be classified as obstacles. In this example, obstacle 560 is in the moving path of movable object 530. Movable object 530 may alter its moving path by changing moving parameters to avoid obstacle 560.

FIG. 6 is a flowchart illustrating an exemplary method 600 of coordinating actions between movable objects, consistent with the disclosed embodiments and can be implemented for example in a system shown in FIG. 4. The technologies described herein are consistent with different operating systems or hardware and can be applied in any variety of environments to take advantage of the described features.

At step 610, a movable object detects the position of a target. Detection of the position may occur by receiving the position from the target, for example, where the target may transmit its GPS coordinates. Detection may alternatively occur by receiving from a remote device a selection of a target in images transmitted from the movable target, identifying the target in images, and determining the position of the target in the images.

At step 620, the position or motion of the movable object may be controlled based on the position of the target. In some embodiments, the movable object may be commanded to maintain a predetermined position relative to the target. For example, the movable object may move to a specified distance from the target, maintain a specified altitude, and maintain a certain angle from the target (e.g., 0-359 degrees). In some examples, the movable object may be controlled to maintain a position and point a camera at a fixed point in space. In other words, the camera may be positioned to point in a predetermined direction relative to the movable object. For example, the movable object may be stationary at a position, point a camera in a predetermined direction, and wait for the target to pass its field of view.

At step 630, the movable object may receive a time reference. The time reference may also be received by other movable objects and/or the target. The time reference may be used to synchronize timing between movable objects and the target. In some embodiments, the time reference may be received from a time service, for example, a global positioning system, atomic clock, etc. In other embodiments, the time reference may be received from a remote source, such as a terminal, server, atomic clock, or other controller. In another embodiment, the time reference may be transmitted from the movable object to other movable objects to synchronize time to a master clock.

At step 640, the movable object receives a command to perform a coordinated action. In some embodiments, the action may be to take an image of the target using a camera or video equipment attached to the movable objects. The command may include timing parameters and identify which movable object will perform the action at what time. In other embodiments, the action may be to take multiple pictures of the target. In other embodiments, the action may be to fly in a coordinated pattern around the target.

At step 650, the movable object performs the coordinated action. In some embodiments, the movable object may take an image of the target, and a second movable object will also take an image of the target. In some embodiments, a plurality of movable objects may take pictures of the target from incremental angles and elevations around the target. For example, dozens of movable objects may be arranged in a spiral configuration around the target. Each movable object may take an image at the same time, or at a time delayed from an adjacent movable object. The images from the movable objects will have different perspectives.

In some examples, the images may be transmitted to a terminal and/or server, where the images may be combined to form three-dimensional images from the two-dimensional images. In other examples, the images may be combined in sequence (e.g., translating and combining overlapping features) to form a bullet time effect. Three-dimensional reconstruction of an image from two-dimensional images and bullet time reconstruction are known in the art.

FIG. 7 is a flowchart illustrating an exemplary method 700 of creating a bullet time effect, consistent with the disclosed embodiments.

At step 710, a first image is taken of a target. For example, a first movable object may identify and track a target. At a predetermined time, the first movable object may take a first picture of the target from a specified position.

At step 720, a second image is taken of a target. For example, a second movable object may identify and tract the target. At a predetermined time (e.g., the same or different time than the predetermined time of the first movable object), the second movable object may take a second picture of the target from a specified position. In some embodiments, many more movable objects surround the target and may take pictures at different times from different perspectives. In other examples, the second image may be taken by the first movable object, but from a different perspective than the first image.

At step 730, the first and second images are combined. In some embodiments, the images may be combined by using SfM algorithms. SfM is a process of estimating three-dimensional structures from two-dimensional image sequences which may be coupled with local motion signals. In some examples, SfM may include: matching two-dimensional features between the images; generating two-dimensional tracks from the matches; generating an SfM model from the two-dimensional tracks; and SfM model refinement using bundle adjustment. Given the images, which depict a number of 3D points from different viewpoints, bundle adjustment can be defined as the problem of simultaneously refining the 3D coordinates describing the scene geometry, the parameters of the relative motion, and the optical characteristics of the camera(s) employed to acquire the images, according to an optimality criterion involving the corresponding image projections of all points. Bundle adjustment can be described as follows by letting $v_{ij}$ denote the binary variables that equal 1 if point i is visible in image j and 0 otherwise. Assume also that each camera j is parameterized by a vector $a_j$ and each 3D point i by a vector $b_i$. Then, bundle adjustment minimizes the total reprojection error with respect to all 3D point and camera parameters, specifically $$\min_{a_j, b_j} \sum_{i=1}^{n} \sum_{j=1}^{m} v_{ij} d(Q(a_j, b_i), x_{ij})^2,$$

where $Q(a_j, b_i)$ is the predicted projection of point i on image j and $d(x,y)$ denotes the Euclidean distance between the image points represented by vectors x and y.

In other embodiments, the images may be combined to create a three-dimensional image while maintaining the time-space relationship of the individual images.

At step 740, a bullet time effect may be generated from the individual images. For example, the images from each movable object may be arranged and displayed consecutively to produce an orbiting viewpoint of an action frozen in time or as hyper-slow-motion.

FIG. 8 is a flowchart illustrating an exemplary method 800 of avoiding an obstacle by a movable object, consistent with the disclosed embodiments.

At step 810, a movable object receives a first dataset with a first perspective. For example, the first dataset may be an image or images from a camera attached to the movable object (e.g., a payload). In other examples the first dataset may be an image or images from a camera remote to the movable object. The image(s) may include surroundings (e.g., physical structures in the vicinity of the movable object) that may not be in the movable object's field of view. Alternatively, the first dataset may be transmitted to a remote computing device for processing.

At step 820, the movable object receives a second dataset with a second perspective. For example, the second dataset may be an image or images from a camera remote to the movable object. The image(s) may include surroundings (e.g., physical structures in the vicinity of the movable object) that may not be in the movable object's field of view. Alternatively, the second dataset may be transmitted to a remote computing device for processing.

At step 830, the images in each dataset and/or datasets are combined to generate a composite dataset. For example, images with the first perspective may be combined using SfM to generate a three-dimensional image of the first dataset. Alternatively, images from the first and second datasets can be combined to form a composite set of images or image. The composite dataset (e.g., composite image) may contain spatial information such that distances between structures may be determined. The composite dataset may be a map based on the images taken by the movable objects. The map may be a synthesis of views (e.g., perceptions) to form a 360° view of the surroundings of the movable objects. The map may further be a three-dimensional reflection of objects in the environment.

At step 840, obstacles are identified (e.g., detected) using the composite dataset. For example, obstacles may be identified in a three-dimensional map or partial map including the surroundings (e.g., environment) of one or both movable objects. An obstacle may be a structure that is in the moving path the movable object. Parameters describing the structure may be extracted from the composite dataset and used to determine if the movable object will collide with the structure given a current moving path. Parameters may include distance from the movable object, size of the structure, motion of the structure, etc. If the movable object may collide with the structure, the structure is designated an obstacle.

At step 850, the movable object may alter its moving path to avoid an obstacle. In some embodiments, moving parameters may be altered to affect the moving path of the movable object. In some embodiments, multiple movable objects may be moving in a predetermined pattern or arrangement, for example around a target. In response to identifying an obstacle in the moving path of at least one movable object, the moving paths of the multiple movable objects may be altered to change the arrangement of the movable objects around the target. For example, the movable objects may change from a diamond arrangement to a pyramid arrangement. Thus, the obstacle may be avoided. Furthermore, the multiple movable objects may rearrange a moving arrangement if it is determined that blind spots are present in the composite dataset.

FIG. 9 is a flowchart illustrating an exemplary method 900 of avoiding an obstacle while coordinating actions between movable objects, consistent with the disclosed embodiments.

At step 910, a movable object receives the position of a target. Position of the target may be determined by analyzing images taken of the target from the movable object. Position may alternatively be determined by receiving the global coordinates of the target from a global positioning system.

At step 920, the movable object may generate a moving path based on the position of the target. The moving path is in turn determined by moving parameters, as described above. In some embodiments, the movable object may track the target. The target may be stationary or moving. In the case of a moving target, the movable object may generate a moving path to maintain a predetermined position relative to the target. The movable object may continuously update the position of the target (e.g., at a rate faster than once a second, for example, every 1 ms, 10 ms, 100 ms, etc.). As the position of the target is updated, the moving path of the movable object is also updated.

At step 930, the movable object receives an image of the target from at least one other movable object. Alternatively, the image may be received from another source capable of taking pictures. In some embodiments, the image may include surroundings not in the view of the movable object. For example, the received image may include surroundings behind the movable object that are not in the field of view of the movable object. In some example, the movable object may be in the image. In some embodiments, a set of images may be received, where the images include different perspectives and/or include motion.

At step 940, the movable object may identify an obstacle in the image. Because the image includes surroundings not in the field of view of the movable object, the movable object may determine that structures are, for example, behind it and in its moving path. If a structure is in the moving path of the movable object, it is considered an obstacle.

At step 950, the movable object may alter its moving path to avoid the obstacle. The moving path may be altered such that the movable object avoids the obstacle, while still tracking the target. In some embodiments, the moving path may be altered to reconfigure an arrangement of multiple movable objects, for example arranged in a predetermined pattern around a target.

At step 960, the movable object may perform an action in coordination with a second movable object (or several other movable objects). In some embodiments, the movable object may also receive a time reference to synchronize timing between other movable objects. In some embodiments, the action may include take an image of the target. In other embodiments, the action may include moving the movable object to a new position, tracking a new target, etc.

The technologies described herein have many advantages in the field of coordination of movable object and in obstacle avoidance. For example, three-dimensional reconstructed images and bullet time effects can be realized dynamically without the need for static emplacements of cameras. Furthermore, movable objects can perceive obstacles in many directions and are no longer limited by the number of sensors and the sensors' fields or view.

Disclosed embodiments may implement computer-executable instructions, such as those included in program modules and executed in a computing environment on a target real or virtual processor device. Program modules may include routines, programs, libraries, objects, classes, components, data structures, etc., that perform particular tasks or implement particular abstract data types. The functionality of the program modules may be combined or split between program modules as desired in various embodiments. Computer-executable instructions for program modules may be executed a processing unit, as described above.

Various operations or functions of the example embodiments can be implemented as software code or instructions. Such content can be directly executable ("object" or "executable" form), source code, or difference code ("delta" or "patch" code). Software implementations of the embodiments described herein can be provided via an article of manufacture with the code or instructions stored thereon, or via a method of operating a communication interface to send data via the communication interface. A machine or computer-readable storage device can cause a machine to perform the functions or operations described, and includes any mechanism that stores information in a tangible form accessible by a machine (e.g., computing device, electronic system, and the like), such as recordable/non-recordable media (e.g., read only memory (ROM), random access memory (RAM), magnetic disk storage media, optical storage media, flash memory devices, and the like). Computer-readable storage devices store computer-readable instruction in a non-transitory manner and do not include signals per se.

As shown in FIG. 10, some embodiments include a system for coordinating movable objects 1000, the system comprising a first module 1010, wherein the first module 1010 operates to control a position or motion of a first movable object based on a position of a target; a second module 1020, wherein the second module 1020 operates to receive a command to perform an action in coordination with at least a second movable object, the second movable object keeping track of the target; and a third module 1030, wherein the third module 1030 operates to perform the action in coordination with the second movable object. In some embodiments, the first movable object includes the modules. In some embodiments, the system further comprises a fourth module, wherein the fourth module operates to receive a time reference common to the first and second movable objects. In some embodiments, the time reference is received from a time service. In some embodiments, the time reference is received from a terminal controlling operations of at least one of the first and second movable objects. In some embodiments, the time reference is received from the second movable object. In some embodiments, the coordinated action includes taking a first image of the target at a time relative to the time reference. In some embodiments, the system further comprises a fifth module, wherein the fifth module operates to receive a second image from the second movable object and process the first and second images to generate a composite image of the target. In some embodiments, the composite image is a three-dimensional reconstruction of the surroundings of at least one of the first and second movable objects. In some embodiments, the system further comprises a fifth module, wherein the fifth module operates to transmit the first image to a remote computing device, wherein the remote computing device is configured to process the received image to form a composite image of the target. In some embodiments, the remote computing device is a terminal, the second movable object, or a server. In some embodiments, performing the action includes taking images, by the first and second movable objects, at a same time. In some embodiments, performing the action includes taking a first image to be combined with a second image taken by the second movable object to generate a composite image of the target, wherein the composite image includes time and space characteristics creating a bullet time effect. In some embodiments, the system further comprises a fourth module, wherein the fourth module operates to detect the position of the target via a sensor. In some embodiments, at least one of the first and second movable objects is an unmanned aerial vehicle. In some embodiments, the system further comprises a fourth module, wherein the fourth module operates to receive a position of the second movable object; and a fifth module, wherein the fifth module operates to generate a moving path to maintain the position of the first movable object relative to the position of the target and/or the position of the second movable object. In some embodiments, the system further comprises a fourth module, wherein the fourth module operates to receive the position of the target from a communication device included in the target. In some embodiments, the first movable object includes a camera, the camera being pointed at the target as the movable object changes position. In some embodiments, the system further comprises a fourth module, wherein the fourth module operates to receive an image from the second moveable object; a fifth module, wherein the fifth module operates to transform the image from the perspective of the second movable object to the perspective of the first movable object; a sixth module, wherein the sixth module operates to identify an obstacle in the transformed image; and a seventh module, wherein the seventh module operates to avoid the obstacle by altering a moving path of the first movable object.

As shown in FIG. 11, some embodiments include a system of obstacle detection 1100 by a computing device, comprising a first module 1110, wherein the first module 1110 operates to receive a first dataset indicating a first surrounding with a first perspective; a second module 1120, wherein the second module 1120 operates to receive a second dataset indicating a second surrounding with a second perspective; a third module 1130, wherein the third module 1130 operates to generate a composite dataset from the first and the second datasets; and a forth module 1140, wherein the forth module 1140 operates to identify an obstacle within the composite dataset. In some embodiments, the first dataset includes a first image taken by a first movable object and the second dataset includes a second image taken by a second movable object. In some embodiments, the composite dataset contains three-dimensional information indicating the size and location of at least one object. In some embodiments, determining the obstacle includes determining a location of an object in the composite dataset relative to a moving path of a movable object and classifying the object as an obstacle if the moving path of the movable object intersects the location of the object. In some embodiments, the system further comprises a fifth module, wherein the fifth module operates to cause a movable object to avoid the obstacle by altering a moving path of the movable object. In some embodiments, the system further comprises a fifth module, wherein the fifth module operates to receive a position of a target; a sixth module, wherein the sixth module operates to generate a moving path of a movable object to maintain a distance and angle relative to the target; and a seventh module, wherein the seventh module operates to cause the movable object to avoid the obstacle by altering the moving path. In some embodiments, the system further comprises an eighth module, wherein the eighth module operates to receive a time reference common to the target and the movable object; and a ninth module, wherein the ninth module operates to cause the movable object to perform an action related to the target in coordination with at least one other movable object. In some embodiments, the action includes taking an image of the target. In some embodiments, the system further comprises a tenth module, wherein the tenth module operates to receive the image from the at least one other movable image; and an eleventh module, wherein the eleventh module operates to create a bullet time effect by combining the image from the movable object and the image from the at least one other movable object. In some embodiments, the computing device is a server or terminal. In some embodiments, the target includes a remote computing device configured to transmit the position of the target and the time reference based on information received in the remote computing device from a global positioning system. In some embodiments, the computing device is an unmanned aerial vehicle.

As shown in FIG. 12, some embodiments include a system for coordinating an action 1200 comprising a first module 1210, wherein the first module 1210 operates to receive a position of a target; a second module 1220, wherein the second module 1220 operates to generate a moving path based on the position of the target to maintain a first unmanned aerial vehicle (UAV) at a position relative to the target; a third module 1230, wherein the third module 1230 operates to receive an image from a second UAV; a forth module 1240, wherein the forth module 1240 operates to identify an obstacle in the image from the second UAV; a fifth module 1250, wherein the fifth module 1250 operates to alter the moving path based on the identification of the obstacle; a sixth module 1260, wherein the sixth module 1260 operates to receive a command to perform an action; and a seventh module 1270, wherein the seventh module 1270 operates to perform the action in coordination with the second UAV. In some embodiments, the system further comprises an eighth module, wherein the eighth module operates to track the target with a camera, wherein the camera is attached to the first UAV. In some embodiments, the action includes taking a picture of the target at a predetermined time. In some embodiments, the system further comprises a ninth module, wherein the ninth module operates to receive a second image from the second UAV; and a tenth module, wherein the tenth module operates to generate a combined image using the image and the second image to create a bullet time effect. In some embodiments, the first UAV has a first camera with a first field of view pointed at a first point in space, and the second UAV has a second camera with a second field of view pointed at a second point in space. In some embodiments, the command to perform the action is received when the target enters the first or second field of view. In some embodiments, the command to perform the action includes a command to take a picture.

Some embodiments include a system for coordinating movable objects, the system comprising means for controlling a position or motion of a first movable object based on a position of a target; means for receiving a command to perform an action in coordination with at least a second movable object, the second movable object keeping track of the target; and means for performing the action in coordination with the second movable object.

Some embodiments include a system of obstacle detection by a computing device, comprising means for receiving a first dataset indicating a first surrounding with a first perspective; means for receiving a second dataset indicating a second surrounding with a second perspective; means for generating a composite dataset from the first and the second datasets; and means for identifying an obstacle within the composite dataset.

Some embodiments include a system for coordinating an action comprising means for receiving a position of a target; means for generating a moving path based on the position of the target to maintain a first unmanned aerial vehicle (UAV) at a position relative to the target; means for receiving an image from a second UAV; means for identifying an obstacle in the image from the second UAV; means for altering the moving path based on the identification of the obstacle; means for receiving a command to perform an action; and means for performing the action in coordination with the second UAV.

Aspects of the embodiments and any of the methods described herein can be performed by computer-executable instructions stored in one or more computer-readable media (storage or other tangible media) or stored in one or more compute readable storage devices, as described herein. The computer-executable instructions can be organized into one or more computer-executable components or modules. Aspects of the embodiments can be implemented with any number and organization of such components or modules. For example, aspects of the disclosed embodiments are not limited to the specific computer-executable instructions or the specific components or modules illustrated in the figures and described herein. Other embodiments may include different computer-executable instructions or components having more or less functionality than illustrated and described herein.

The order of execution or performance of the operations in the disclosed embodiments illustrated and described herein is not essential, unless otherwise specified. That is, the operations can be performed in any order, unless otherwise specified, and embodiments can include additional or fewer operations than those disclosed herein. For example, it is contemplated that executing or performing a particular operation before, contemporaneously with, or after another operation is within the scope of aspects of the disclosed embodiments.

Having described the disclosed embodiments in detail, it will be apparent that modifications and variations are possible without departing from the scope of aspects as defined in the appended claims. For instance, elements of the illustrated embodiments may be implemented in software and/or hardware. In addition, the technologies from any embodiment or example can be combined with the technologies described in any one or more of the other embodiments or examples. In view of the many possible embodiments to which the principles of the disclosed technology may be applied, it should be recognized that the illustrated embodiments are examples of the disclosed technology and should not be taken as a limitation on the scope of the disclosed technology. Therefore, it is intended that all matter contained in the above description and shown in the accompanying drawings shall be interpreted as illustrative and not in a limiting sense.

The invention claimed is:

1. A method for coordinating an action, the method comprising:
receiving a position of a target for tracking;
generating a moving path for a first unmanned aerial vehicle (UAV) based on the position of the target to maintain the first UAV at a position relative to the position of the target;
while the first UAV moves along the moving path to track the target, receiving an image from a second UAV;
identifying an obstacle in the image from the second UAV;
altering the moving path of the first UAV based on the identification of the obstacle;
receiving a command to perform an action; and
while the first UAV moves along the altered moving path to avoid the obstacle and track the target, performing the action with the first UAV in coordination with the second UAV.

2. The method of claim 1, further comprising tracking the target with a camera, wherein the camera is attached to the first UAV.

3. The method of claim 2, wherein the action includes taking a first image of the target at a predetermined time with the camera.

4. The method of claim 3, further comprising:
receiving a second image of the target from the second UAV; and
generating a combined image of the target using the first image and the second image to create a bullet time effect.

5. The method of claim 1, wherein the first UAV has a first camera with a first field of view pointed at a first point in space, and the second UAV has a second camera with a second field of view pointed at a second point in space.

6. The method of claim 5, wherein the command to perform the action is received when the target enters the first field of view or the second field of view.

7. The method of claim 1, wherein the command to perform the action includes a command to take an image.

8. The method of claim 1, further comprising transforming the image received from the second UAV from a perspective of the second UAV to a perspective of the first UAV.

9. A non-transitory computer-readable medium storing instructions that, when executed, cause a first unmanned aerial vehicle (UAV) to perform a method for coordinating an action, the method comprising:
    receiving a position of a target for tracking;
    generating a moving path for the first UAV based on the position of the target for maintaining the first UAV at a position relative to the position of the target;
    while the first UAV moves along the moving path to track the target, receiving an image from a second UAV;
    identifying an obstacle in the image from the second UAV;
    altering the moving path of the first UAV based on the identification of the obstacle;
    receiving a command to perform an action; and
    while the first UAV moves along the altered moving path to avoid the obstacle and track the target, performing the action with the first UAV in coordination with the second UAV.

10. The non-transitory computer-readable medium of claim 9, wherein the method further comprises tracking the target with a camera, wherein the camera is attached to the first UAV.

11. The non-transitory computer-readable medium of claim 10, wherein the action includes taking a first image of the target at a predetermined time with the camera.

12. The non-transitory computer-readable medium of claim 11, wherein the method further comprises:
    receiving a second image of the target from the second UAV; and
    generating a combined image of the target using the first image and the second image to create a bullet time effect.

13. The non-transitory computer-readable medium of claim 9, wherein the first UAV has a first camera with a first field of view pointed at a first point in space, and the second UAV has a second camera with a second field of view pointed at a second point in space.

14. The non-transitory computer-readable medium of claim 13, wherein the command to perform the action is received when the target enters the first field of view or the second field of view.

15. The non-transitory computer-readable medium of claim 9, wherein the command to perform the action includes a command to take an image.

16. The non-transitory computer-readable medium of claim 9, the method further comprising transforming the image received from the second UAV from a perspective of the second UAV to a perspective of the first UAV.

17. A system for coordinating an action, the system comprising:
    one or more microprocessors; and
    a controller running on the one or more microprocessors, the controller configured to:
        receive a position of a target for tracking;
        generate a moving path for a first unmanned aerial vehicle (UAV) based on the position of the target to maintain the first UAV at a position relative to the position of the target;
        while the first UAV moves along the moving path to track the target, receive an image from a second UAV;
        identify an obstacle in the image from the second UAV;
        alter the moving path of the first UAV based on the identification of the obstacle;
        receive a command to perform an action; and
        while the first UAV moves along the altered moving path to avoid the obstacle and track the target, perform the action with the first UAV in coordination with the second UAV.

18. The system of claim 17, wherein the controller is configured to track the target with a camera, wherein the camera is attached to the first UAV.

19. The system of claim 18, wherein the action includes taking a first image of the target at a predetermined time with the camera.

20. The system of claim 19, wherein the controller is configured to:
    receive a second image of the target from the second UAV; and
    generate a combined image of the target using the first image and the second image to create a bullet time effect.

21. The system of claim 17, wherein the first UAV has a first camera with a first field of view pointed at a first point in space, and the second UAV has a second camera with a second field of view pointed at a second point in space.

22. The system of claim 21, wherein the command to perform the action is received when the target enters the first field of view or the second field of view.

23. The system of claim 17, wherein the controller is configured to transform the image received from the second UAV from a perspective of the second UAV to a perspective of the first UAV.

* * * * *